United States Patent
Fukuda

[11] Patent Number: 5,366,130
[45] Date of Patent: Nov. 22, 1994

[54] DANCER ROLLER HAVING MULTI-RACK AND PINION TENSION CONTROL

[75] Inventor: Masao Fukuda, Shiga, Japan

[73] Assignee: Ishida Co., Ltd., Japan

[21] Appl. No.: 194,822

[22] Filed: Feb. 14, 1994

Related U.S. Application Data

[63] Continuation of Ser. No. 89,457, Jul. 9, 1993, abandoned.

[30] Foreign Application Priority Data

Aug. 24, 1992 [JP] Japan .................................. 4-273365

[51] Int. Cl.⁵ .......................................... B65H 23/18
[52] U.S. Cl. ..................................... 226/44; 226/194; 226/118
[58] Field of Search ................. 226/44, 194, 199, 198, 226/24, 26, 118; 242/75, 75.46

[56] References Cited

U.S. PATENT DOCUMENTS

| | | | |
|---|---|---|---|
| 3,322,315 | 5/1967 | Eberlin | 226/44 |
| 3,475,255 | 10/1969 | Lang | 226/118 X |
| 3,659,767 | 5/1972 | Martin | 226/44 X |
| 3,823,859 | 7/1974 | Anderson | 226/118 |
| 3,861,303 | 1/1975 | Darn, Jr. | 226/44 X |
| 5,083,693 | 1/1992 | Pohl | 226/44 |
| 5,195,690 | 3/1993 | Cross et al. | 226/44 X |

*Primary Examiner*—Clifford D. Crowder
*Assistant Examiner*—John J. Calvert
*Attorney, Agent, or Firm*—Heller, Ehrman, White & McAuliffe

[57] ABSTRACT

A device is adapted to reduce as much as possible the effective length of a spring for providing a load on a mobile member, such as a dancer roller for absorbing the slackness in a web of packaging material, with respect to the distance by which it may move. Two pinions with different diameters are affixed to the mobile member, the larger pinion engaging with a mobile rack and the smaller pinion engaging with a fixed rack. The mobile rack is adapted to move so as to cancel the displacement by the mobile member by a distance determined by the ratio of the diameters of the pinions, thereby reducing the effective length of the spring.

4 Claims, 2 Drawing Sheets

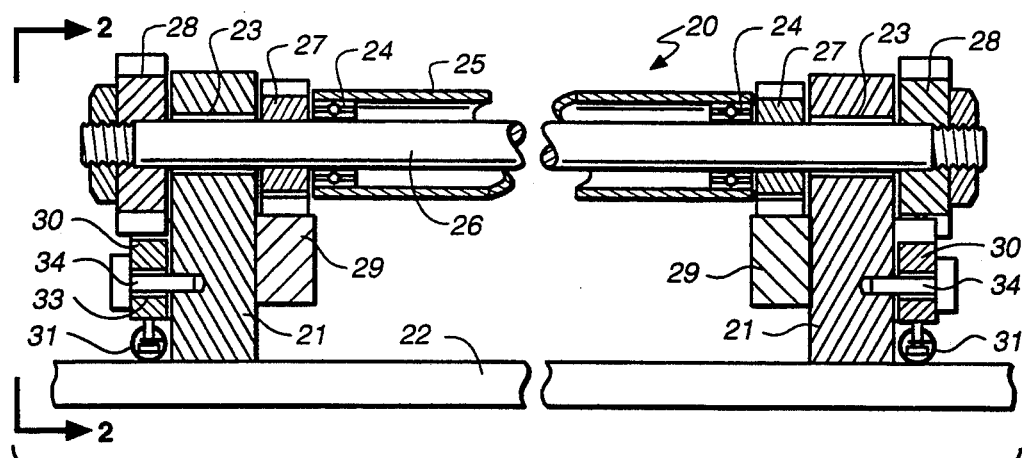
FIG._1
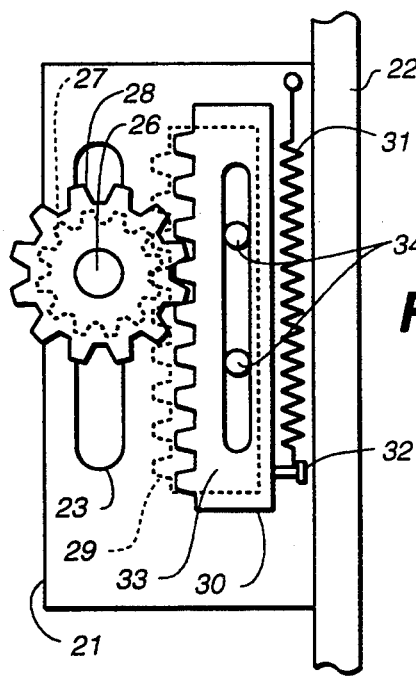
FIG._2
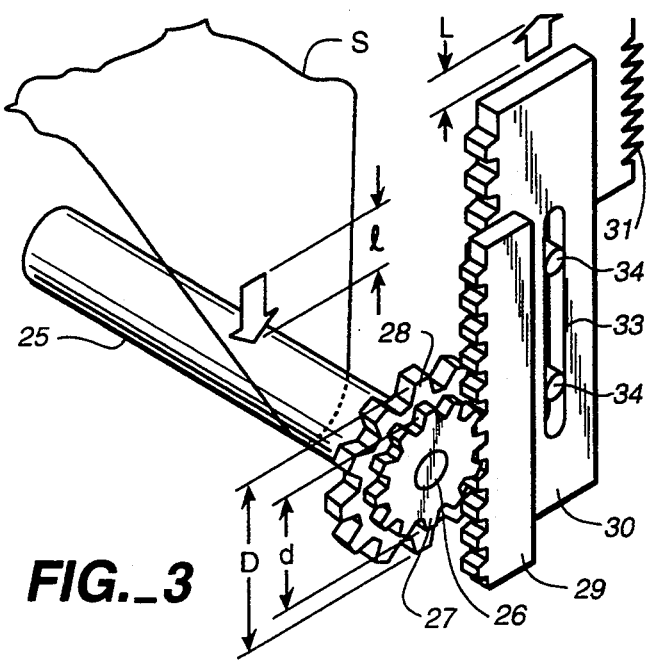
FIG._3

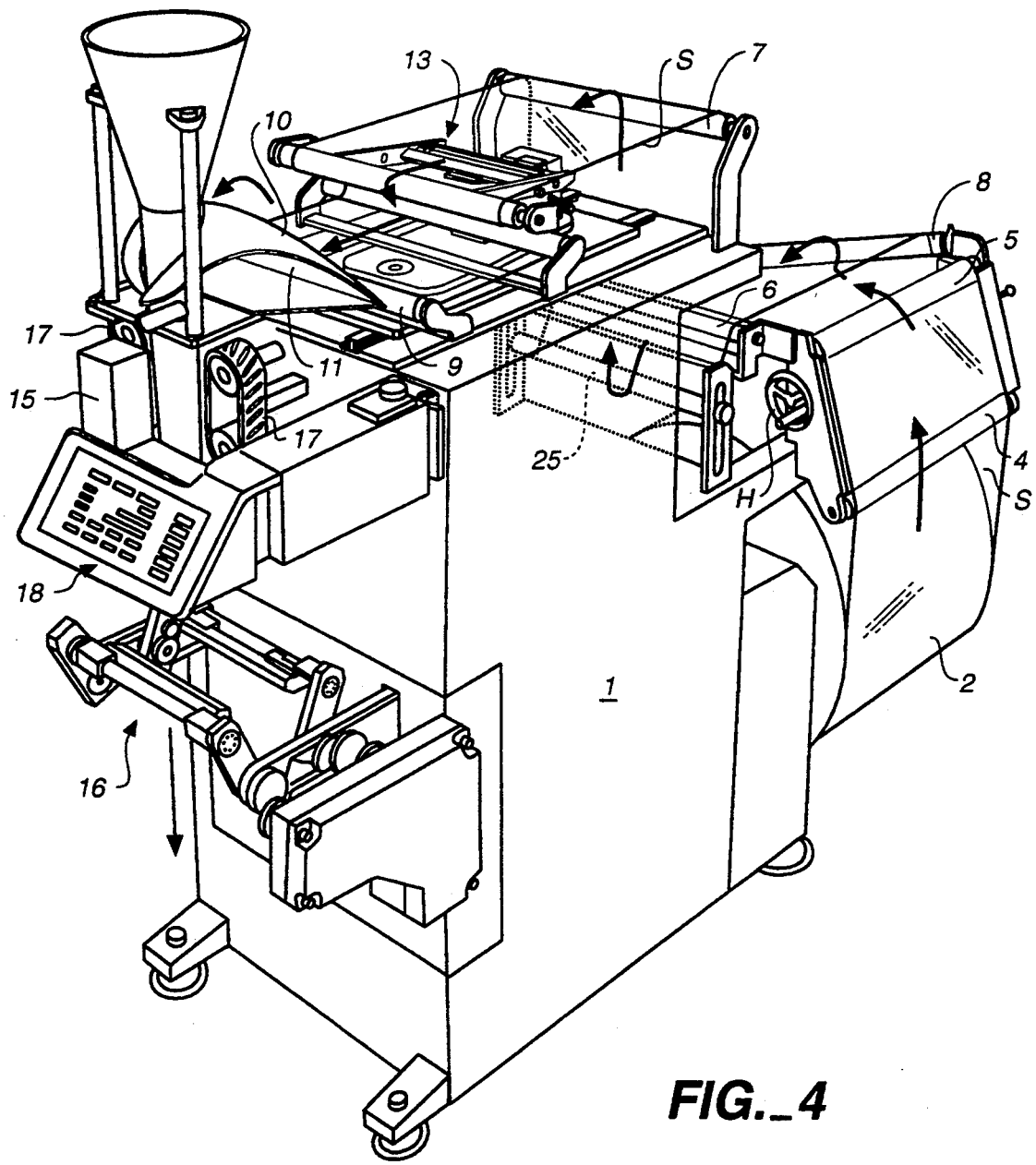
FIG._4

DANCER ROLLER HAVING MULTI-RACK AND PINION TENSION CONTROL

This is a continuation of U.S. patent application Ser. No. 08/089,457 filed Jul. 9, 1993, now abandoned.

BACKGROUND OF THE INVENTION

This invention relates to a device for reducing the effective length of a spring for providing a load, for example, on a dancer roller used for absorbing slackness in a web.

The film-transporting mechanism for a packaging machine shown in FIG. 4, for example, utilizes a dancer roller 25 on which a specified load is applied by means of a spring so as to absorb slackness in a web of package-forming material S which may occur while it is being transported on its travel path. Since the distance traveled by a dancer roller of this kind is generally quite large, a spring with a fairly large total length must be used if it is to be directly attached to the roller without using a lever. This makes it difficult not only to reduce the size of the device as a whole but also to stably carry out the function of absorbing slackness in the package-forming material.

The present invention has been accomplished in view of such problems. It is therefore an object of this invention to provide a new device for reducing as much as possible the effective length of a spring used for providing a load.

SUMMARY OF THE INVENTION

A device according to the present invention, with which the above and other objects can be achieved, may be characterized as having two gear wheels of different diameters affixed coaxially to a mobile member, one of them engaging with a fixed rack gear and the other engaging with a mobile rack gear which is movable along the fixed rack gear and to which one end of a load-providing spring is affixed. The movable rack gear is caused to move in the direction of cancelling the motion of the mobile member such that the effective length of the spring can be significantly reduced if the ratio of the diameters of the gear wheels is properly selected.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a sectional view of a device according to the present invention as applied to a mechanism for absorbing slackness of a package-forming material;

FIG. 2 is a side view of the device shown in FIG. 1, taken along the line II—II;

FIG. 3 is a diagonal view of a portion of the device for showing the principle of the invention; and FIG. 4 is a diagonal view of a packaging machine including the device of FIGS. 1 and 2.

DETAILED DESCRIPTION OF THE INVENTION

The invention will be described by way of an example. To start, a packaging machine incorporating a device embodying the present invention will be schematically described with reference to FIG. 4.

FIG. 4 shows a bag maker-packaging machine 1 comprised of a film-transporting mechanism 3 supporting a roll 2 of a package-forming material S (hereinafter referred to as the film), a series of guide rollers 4, 5, 6 and 7 for guiding the film S to a former 10, an obliquely set roll 8 for changing the direction of travel of the film S approximately by 90°, a dancer roller 25 (to be described below) for absorbing slackness in the film S pulled out of the roll 2, a positioning mechanism 13 for positioning a downstream guide roller 9 correctly adjacent to a skirt part 11 of the former 10 according to the size of the former 10, a longitudinal sealing mechanism 15 for sealing overlapped side edge portions of the film S which has been bent by the former 10 into a tubular form, a transverse sealing mechanism 16 for sealing its upper and lower ends transversely, a pair of left-hand and right-hand pull-down belts 17 for guiding the tubularly formed film S to the transverse sealing mechanism 16 while supporting it by applying a negative pressure, and an operator's panel 18 disposed on a front surface of the machine structure. FIGS. 2 and 3 show a device 20 for reducing the effective length of a spring 31 provided for providing a load on the aforementioned dancer roller 25. Its basic principles will be explained with reference to FIG. 3.

Numerals 21 in FIG. 1 indicate supporting members affixed to both sides of a frame 22, each having an elongated guide hole 23 formed therethrough. A mobile shaft 26, to which the dancer roller 25 is rotatably attached through bearings 24, is passed through these holes 23 so as to be slidable up and down therein.

A smaller pinion 27 and a larger pinion 28 with different diameters are affixed to each end of this mobile shaft 26, sandwiching each of the supporting members 21 therebetween. Each smaller pinion 27 (with a smaller diameter) is engaged with a fixed rack 29 affixed vertically to one surface of the supporting members 21. Each of the larger pinions 28 (with a larger diameter) is engaged with a mobile rack 30 on the opposite surface of the supporting member 21. Each mobile rack 30 serves to transfer the force (load) of a spring 31 acting thereon to the dancer roller 25 through the larger pinion 28. For this purpose, each mobile rack 30 is attached to one end of the spring 31 through a pin 32, the other end of the spring 31 being affixed to the frame 22 (through the supporting member 21), and is so set as to be able to move vertically up and down, there being two (upper and lower) guide pins 34 on each side of the supporting member 21 so as to remain in elongated holes 33 formed through the mobile racks 30.

Suppose the tension in the film S suddenly dropped in its path. A downward force (load) is applied on the dancer roller 25 from the springs 31 through the mobile racks 30 and the larger pinions 28 engaged therewith, causing the dancer roller 25 to drop by a distance corresponding to the slackness in the film and absorbing the slackness by applying a downward tension on the part of the film between the rollers 6 and 7.

Assume now that the dancer roller 25 moved downward by a vertical distance of l to absorb the slackness. Since the larger pinions 28 and the smaller pinions 27 are both affixed to the mobile shaft 26, they rotate by the same angle, the mobile racks 30 engaging with the larger pinions 28 are pushed upward by a distance given by $lD/d$ where D is the diameter of the larger pinions 28 and d is the diameter of the smaller pinions 27. Thus, the net distance L traveled by the mobile rack 30 from its initial position is given by $L=\{(D/d)-1\}l$. If the diameter d of the smaller pinions 27 is 30 mm, the diameter D of the larger pinions 28 is 40 mm and the dancer roller 25 dropped by l=150 mm, the distance L traveled by the mobile rack 30 from its initial position becomes 50 mm, which is only one third of the distance l dropped by the dancer roller 25. The distance L traveled by the mobile rack 30 can be made smaller by making the ratio D/d smaller (that is, closer to 1), and the effective length of the spring 31 can be reduced accordingly.

Although the present invention has been described above with reference to only one example, this is not intended to limit the scope of the invention. For example, although the present invention was described above as applied to a dancer roller for absorbing slackness in a film, this invention can be equally applicable to a device for applying a specified tensile force to an elongated material by using the tension in a spring. As another example, although pinions and racks were used as examples of mutually engaging machine elements, other mutually engaging machine elements may be substituted such as a chain affixed to a rod and a sprocket wheel engaging with this chain. These motion-communicating means, therefore, may be herein referred to as "gear wheel means" and "rack gear means." Moreover, the present invention can be applied to apparatus in which the expansive force of a compressed spring is used as a load. In such apparatus, the total length of the compressed spring can be reduced by making the diameter of the pinion engaging the mobile rack smaller than the diameter of the pinion engaging the stationary rack.

In summary, a load-providing spring is connected to a mobile rack adapted to move parallel to a fixed rack, and two gear wheels with different diameters are affixed to a mobile member on which the force of the spring is acting and engaged with these racks individually. With a device thus formed, the actual distance traveled by the mobile rack can be reduced by moving it in the direction of canceling the displacement of the mobile member and by a distance determined by the ratio of the diameters of the two gear wheels. In this way, the effective length of the spring can be made much smaller than the displacement by the mobile member. Thus, the overall size of apparatus of all sorts which make use of the biasing force of a spring can be reduced significantly.

What is claimed is:

1. A device for reducing the effective length of a spring for providing a load, said device comprising:
   a mobile member which is movable under the influence of a load provided by said spring;
   a first gear wheel and a second gear wheel having different diameters and coaxially attached to said mobile member;
   a linearly mobile means for converting linear motion thereof into rotational motion of said second gear wheel, and
   a fixed means engaging with said first gear wheel for converting rotary motion of said first gear wheel to a linear motion thereof parallel to the linear motion of said linearly mobile means.

2. The device of claim 1 wherein said spring provides said load in a specified direction and said mobile member is elongated and extended transversely to said specified direction.

3. The device of claim 2 wherein said mobile member includes a dancer roller.

4. The device of claim 2 wherein said fixed and mobile means both extend in said specified direction.

* * * * *